Oct. 19, 1965  C. D. BENNETT  3,212,377
ELECTRONIC TIMING AND CUTTING APPARATUS AND METHOD
Filed Dec. 18, 1961  3 Sheets-Sheet 1

INVENTOR.
C. DENVER BENNETT
BY Fay & Fay
ATTORNEYS

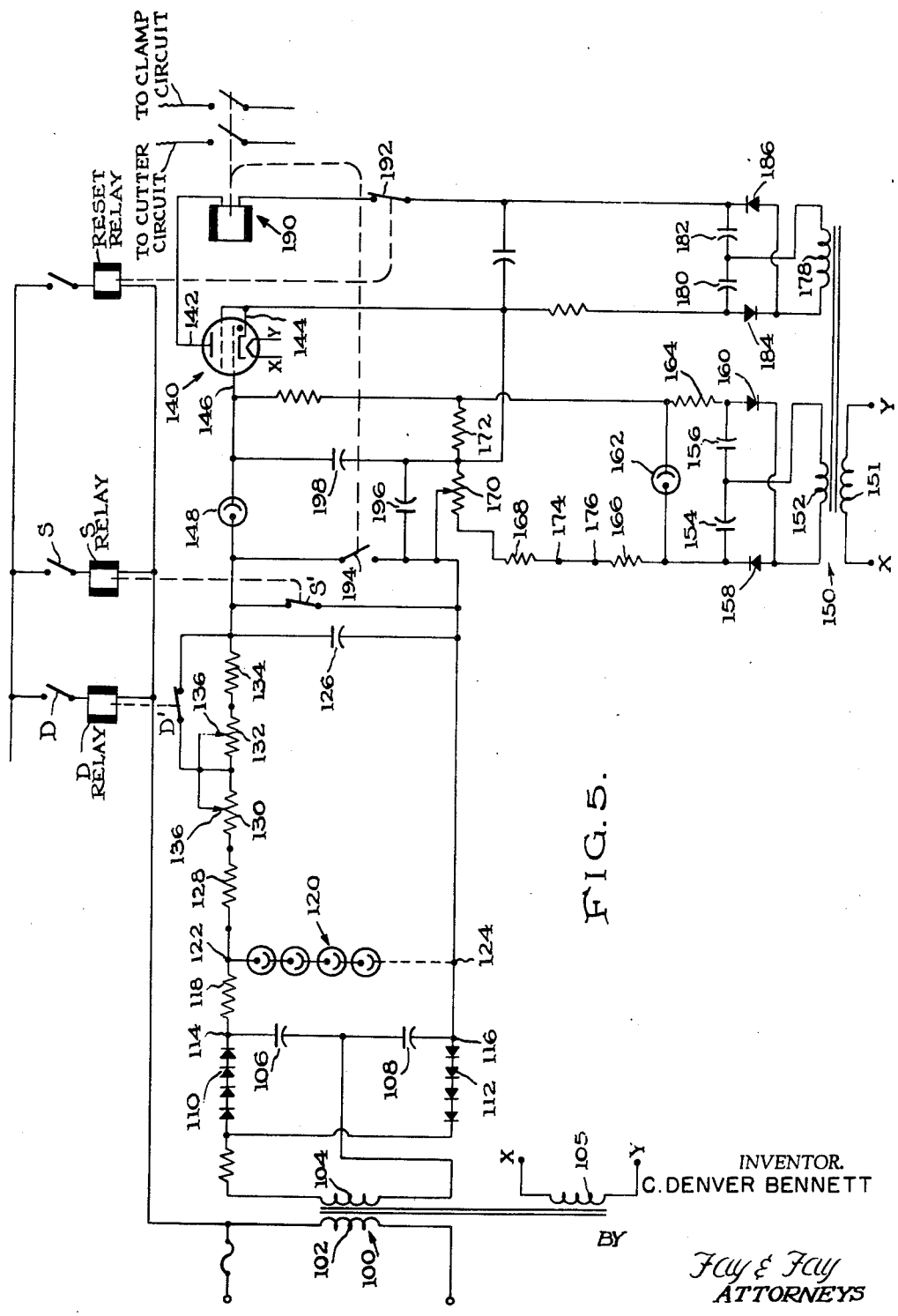

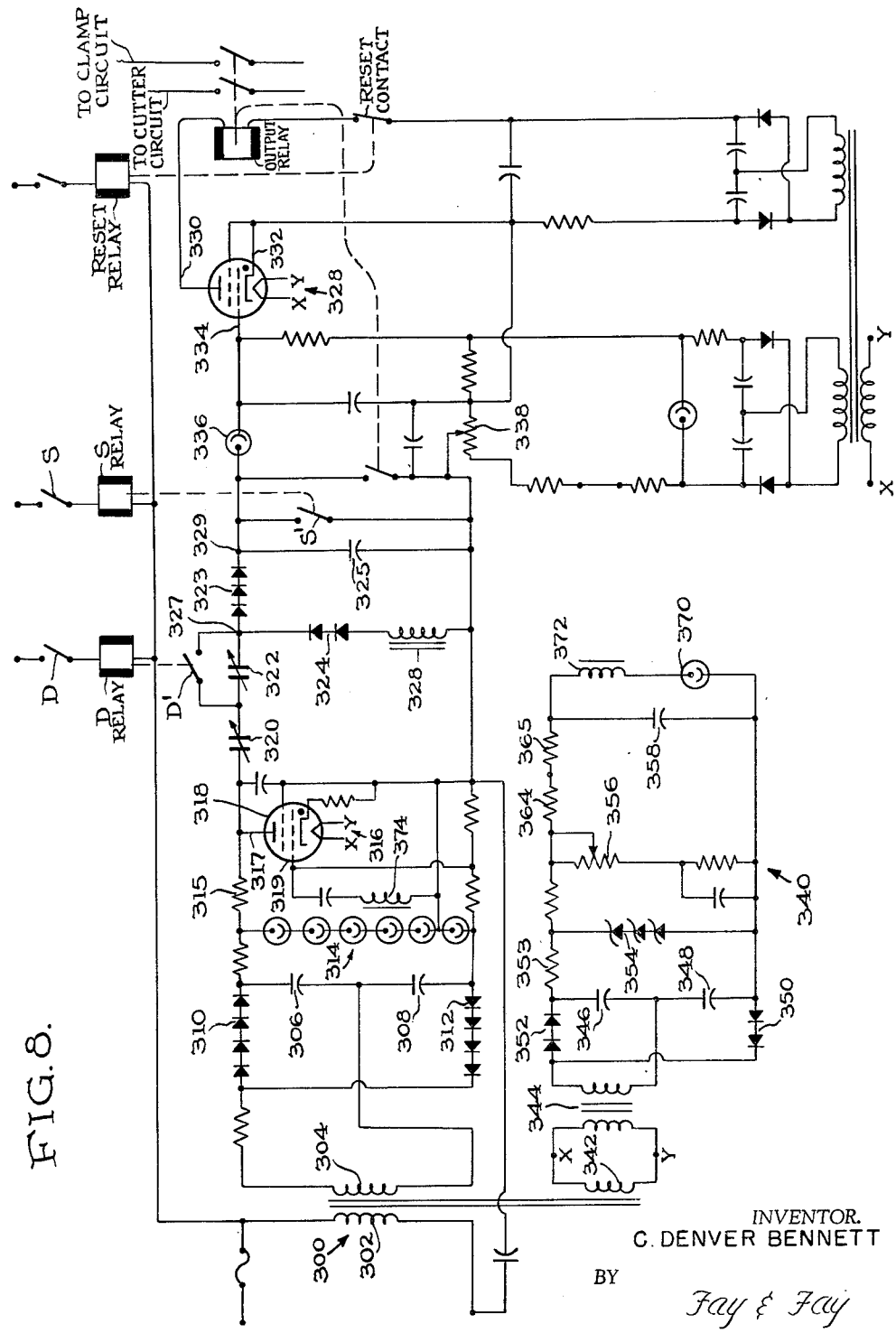

United States Patent Office 3,212,377
Patented Oct. 19, 1965

3,212,377
ELECTRONIC TIMING AND CUTTING
APPARATUS AND METHOD
Charles Denver Bennett, 485 Maplewood Drive,
Struthers, Ohio
Filed Dec. 18, 1961, Ser. No. 160,216
30 Claims. (Cl. 83—42)

This invention relates to an apparatus for and method of measuring and dividing lengths of longitudinally moving members such as pipes, rods, sheets, extrusions, and the like, into predetermined fractional lengths, such as halves or thirds, or into predetermined fixed lengths, as desired, and to electronic timing circuits useful for measuring lengths of moving pipes and the like and for dividing the moving pipes into predetermined fractional or fixed lengths as desired.

In the metal processing industry there is a great need for apparatus for subdividing lengths of longitudinally moving materials such as pipes, rods, and the like into predetermined fractional lengths or into predetermined fixed lengths. However, the apparatus which has been provided in accordance with the prior art for accomplishing this purpose has been unsatisfactory in many respects. Thus, for example, the prior art apparatus generally has been very complicated, involving the use of great numbers of electronic tubes and relays which necessitated large financial outlays for their initial installation and which also presented many maintenance problems. The prior art apparatus has also been functionally inadequate in some respects, as, for example, being incapable of recognizing a pipe length which is too short to be cut into fractions such as halves and instead cutting such pipe into two equal pieces each of which is too short and can be used only as scrap. Furthermore, the complexities of the prior art apparatus generally have been such that only highly skilled electronic technicians are capable of effecting the necessary repairs when a breakdown occurs on such apparatus.

Accordingly, it is an object of this invention to provide an apparatus for and method of cutting lengths of longitudinally moving objects such as pipes, rods, sheets, and the like, into predetermined fractional lengths or into predetermined fixed lengths, with the apparatus being such as to require only low first cost and little maintenance.

It is another object of this invention to provide an apparatus for cutting pipes, rods, and the like, which is relatively uncomplicated compared to the prior art apparatus for this purpose and which has fewer parts than the prior art apparatus.

It is another object of this invention to provide an apparatus for subdividing pipes, rods, and the like, which includes electronic circuitry which is relatively simple compared to prior art apparatus for accomplishing this purpose, and which includes relatively simple controls for adjusting the apparatus for varying operating conditions.

Still another object of the invention is to provide an apparatus for subdividing pipes, rods, and the like, which is reliable and efficient in its operation and which is capable of sensing when the rod or pipe is too short to be subdivided thereby to insure that at least one usable length is produced from a pipe which is too short for subdivision, rather than a plurality of fractional lengths, none of which is equal to the minimum length required.

It is another object of the invention to provide an apparatus and method which can be used either for cutting longitudinally moving lengths of pipes, rods, sheets, and the like into predetermined fractional lengths or into repeating fixed lengths as desired.

Still another object of the invention is to provide an apparatus of the type hereinabove described which operates with a high degree of accuracy in cutting the pipes or the like into fractional lengths or into fixed lengths.

Still another object of the invention is to provide an apparatus of the type hereinabove described in which the pipe or the like can be cut into predetermined fractional lengths or into predetermined fixed lengths regardless of whether the pipe travels at a constant speed or at a variable speed.

In achievement of these objectives, there is provided in accordance with this invention an apparatus for and method of measuring and dividing lengths of longitudinally moving material such as pipes and the like into either predetermined fractional lengths or predetermined fixed lengths. The apparatus includes a timing circuit having a capacitor which is charged through a current limiting impedance to the predetermined trigger voltage of a gaseous discharge thyratron tube or other equivalent electronic control device to cause the thyratron tube to fire and actuate a cutting and clamping device at the moment when the mid-point or other predetermined point of the longitudinally moving material arrives at the cutter. Suitable sensing devices, preferably proximity switches, are positioned adjacent the path of movement of the material being cut to cause the timing capacitor to begin charging when the leading end of the material being cut reaches the cutting device, and also to control the rate of charging of the timing capacitor as a function of the length of the material to compensate for variations in length of material being cut from a predetermined minimum length.

In an embodiment of the invention provided for use where the material being cut moves at a constant rate of speed, the timing capacitor is charged through a limiting resistance, and one of the sensing devices controls the amount of limiting resistance in series with the timing capacitor to control thereby the time required for the timing capacitor to reach the trigger voltage of the thyratron control tube.

In an embodiment of the invention provided for use where the material being cut moves at a variable speed, the timing capacitor is charged by incremental charging pulses having a frequency which is proportional to the rate of movement of the moving material, thus compensating for the variable rate of movement of the material being cut. In the embodiment provided for material moving at a variable speed, the amplitude of the incremental charging pulses is controlled in dependence on the length of the moving material, thereby to compensate for variations in length of the material being cut from a predetermined minimum length.

The timing apparatus of the invention also may be used for cutting predetermined fixed lengths of moving material, rather than predetermined fractional lengths, if desired. The timing device may be used also for other types of measuring or timing operations and is not restricted to use in apparatus for cutting moving material.

Throughout the specification, the material which is being subdivided will be referred to as a pipe for simplicity in description. However, it will be understood that the term pipe is used as representative of any moving material which is to be cut, such as pipes, rods, sheets, extrusions, or the like.

Further objects and advantages of the invention will become apparent from the following description taken in conjunction with the accompanying drawings in which:

FIG. 5 is a complete schematic diagram of the timing circuit of the invention used for controlling the cutting into two equal lengths of a longitudinally moving pipe or the like which moves at a constant speed, the simplified schematic diagram of which was shown in FIG. 2;

FIG. 8 is a complete schematic diagram of the timing circuit used for controlling the cutting into two equal lengths of a pipe which is moving at a variable speed.

Figure 1:
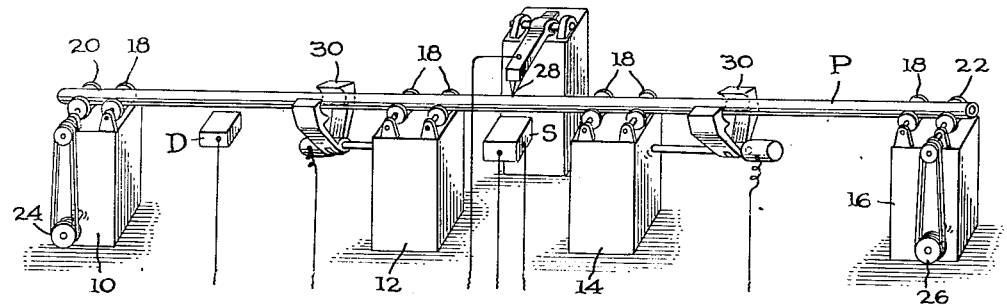
FIG. 1 is a schematic view showing the apparatus of the invention employed for cutting longitudinally moving pipe into predetermined fractional lengths or into predetermined fixed lengths.

Referring now to FIG. 1 which shows schematically the orientation of the various parts of the apparatus relative to the longitudinally moving pipe P which is being cut, there are shown a plurality of longitudinally spaced pedestals or other suitable conveyor supports generally indicated at 10, 12, 14 and 16 on which are mounted conveyor rolls 18, 20 and 22. Certain of the conveyor rolls, such as rolls 20 and 22 at opposite ends of the roll conveyor structure, are driven by power drive means such as the motor-driven drive shafts 24 and 26, respectively. A length of pipe P is supported for movement along the plurality of rolls 18, 20, 22, the rolls being V-shaped or otherwise suitably shaped to receive the pipe being transferred. A cutter 28 is suitably supported in overlying relation to the moving pipe at a point midway between pedestals 12 and 14. Clamp members 30 are positioned on either side of the pedestals 12 and 14 in position to clamp the pipe and stop the motion thereof when the cutter 28 is energized to cut the pipe at the predetermined fractional length or predetermined fixed length as will be explained hereinafter.

In order to control the clamping and cutting operation when a predetermined fractional length or a predetermined fixed length has passed by the cutter 28, a pair of sensing switches S and D are provided. When the pipe is to be cut into two equal lengths, the S and D switches are spaced apart a distance corresponding to the minimum length of pipe before cutting of the pipe which is to be cut. Thus, for example, if a 100-foot length of pipe is the minimum length of pipe to be cut, the S and D switches are spaced apart 100 feet along the path of movement of the pipe. The S switch is positioned at the same position as the cutter along the path of travel of the pipe, while the D switch is displaced from the S switch in the direction of the trailing end of the pipe by a distance equal to the length before cutting of the minimum length of pipe to be cut. The spacing between the S and D switches varies for different fractional cuts and the explanation just given of the positions of the S and D switches applies only where the pipe is to be cut into two equal lengths.

The S and D switches are preferably switches of the proximity type which do not require actual contact with the moving material. Proximity switches are well known in the art and may operate either on the inductive or capacitive principle. The use of proximity switches for this purpose is preferred due to the fact that it avoids wear on the switches. However, switches of the type which actually are in contact with the moving pipe may be used if preferred.

The S switch is actuated at the instant that the leading end of the pipe passes by it, closure of the S switch energizing the S relay and operating the normally closed contact S' to open position to start a capacitor charging operation, the length of time required to charge the capacitor determining time of firing of a thyratron gas tube which controls the pipe clamping and cutting operations.

The D switch is actuated by the presence of a pipe adjacent thereto, the length of time that the D switch is actuated after the initial actuation of the S switch by the leading end of the pipe being a measure of the length of the pipe in excess of the minimum pipe length for which the S and D switches are set. Actuation of the D switch by the presence of a pipe actuates the D relay to open the normally closed D' contact which is connected in shunting relation to limiting resistance in the capacitor charging circuit, the D' contact continuing to remain open as long as the pipe continues to pass by the D switch. The opening of the shunting D' contact by actuation of the D switch increases the time required to charge the capacitor which controls the time of firing of the thyratron control tube, thereby increasing the time interval before actuation of the pipe clamping and cutting devices, as will be described hereinafter.

Figure 2:
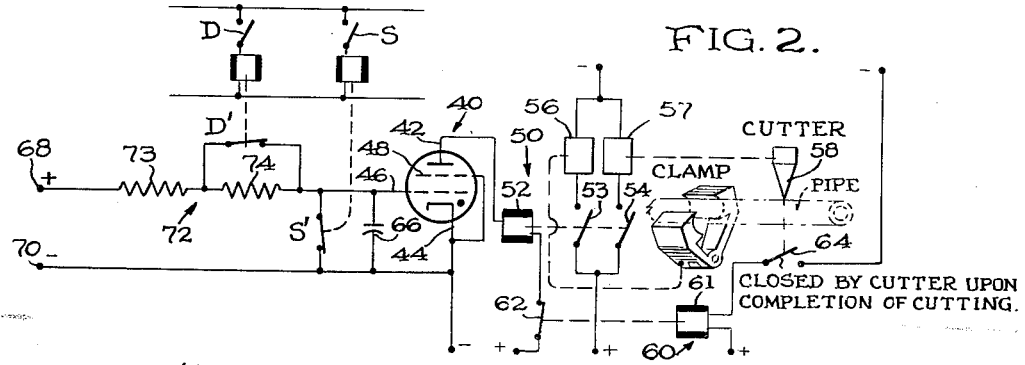
FIG. 2 is a simplified schematic diagram illustrating the timing device of the invention used for controlling the cutting into two equal lengths of a longitudinally moving pipe or the like which moves at a constant speed.

Referring now to FIG. 2 of the drawings, there is shown a simple schematic diagram illustrating the principle of the timing and control circuit used for subdividing a longitudinally moving pipe or the like into two equal lengths. The timing circuit includes a gaseous discharge tube of the thyratron type, preferably a 2D21W thyratron generally indicated at 40, including anode 42, cathode 44, a control grid 46, and also a screen grid 48, which is connected to cathode 44. The operating coil 52 of a relay generally indicated at 50 is connected in the output circuit of anode 42. Relay 50 includes two normally open contacts 53 and 54 which are actuated to closed position by energization of relay operating coil 52 due to current flow in the circuit of anode 42 when the thyratron tube 40 fires. Contacts 53 and 54 are respectively in the circuits of solenoids 56 and 57. Closure of contact 53 is effective to energize solenoid 56 to actuate clamps 30 to a position in which the pipe P is clamped against movement to permit cutting of the pipe. Closure of contact 54 is effective to energize solenoid 57 to actuate cutter 58 to cut the pipe.

Since it is a characteristic of gaseous discharge thyratron tubes that once firing of the tube has occurred the control grid loses control, it is necessary to open the anode circuit to cause the tube to revert to an open circuit condition in which the control grid again has control. To open the anode circuit as just described and thus reset the tube for the next cutting operation, a reset relay generally indicated at 60 is provided. Reset relay includes an operating coil 61 which controls a normally closed contact 62 in the anode circuit of tube 40. Operating coil 61 of reset relay 60 is energized by closure of contact 64 upon the completion of the pipe cutting operation, contact 64 being actuated to closed position by movement of cutter 58 to a position indicative of completion of the cutting operation. Energization of the operating coil 61 of reset relay 60 opens normally closed contact 62 in the anode circuit of tube 40 thereby to reset the tube for another cycle of operation.

It is a well-known characteristic of thyratron gaseous discharge tubes that at a certain predetermined anode potential the tube will fire or become conductive when a predetermined trigger voltage is applied to the control grid of the tube. In the timing circuit of FIG. 2, the time required for the thyratron tube 40 to reach the trigger voltage is controlled through a resistance-capacitance timing circuit including a capacitor 66 connected between grid 46 and cathode 44. Capacitor 66 is connected across a constant voltage regulated D.C. supply at terminals 68 and 70 in series with a limiting resistor generally indicated at 72, including two equal series-connected resistance sections 73 and 74. In accordance with an important feature of the invention, the contacts S' and D' previously referred to are connected in the timing circuit in a manner which will now be described.

The S' contact is placed in parallel with capacitor 66 so that the charging of the capacitor through resistors 73 and 74 does not begin until the S switch adjacent the path of movement of the pipe has been actuated by the passage adjacent thereto of the pipe which is to be cut to cause the S relay to move contact S' from its normally closed position to open position. Opening of the S' contact removes the short circuit shunt path which had existed across capacitor 66 when contact S' was closed, and permits capacitor 66 to begin charging.

The D switch which, in the embodiment of FIGS. 2–5 is mounted a distance from the S switch equal to the minimum length of pipe which is to be cut, or a distance equal to twice the length of the cut which is to be made, actuates the D relay to open the normally closed D' contact when pipe is passing adjacent the D switch. The D' contact is connected in parallel or shunting relation with the resistance section 74 which, as previously stated, is identically equal in resistance value to resistance section 73 and thus equal to exactly one-half the total resistance 72. Thus, when the D switch is actuated due to the presence of pipe passing adjacent thereto, normally closed contact D' is opened by the D relay, and both resistance sections 73 and 74 are connected in series relation with capacitor 66. On the other hand, if no pipe is adjacent the D switch, the D relay is de-energized to permit reclosing of the normally closed D' contact.

If the circuit constants are so adjusted, for example, that it takes 10 seconds for the capacitor 66 to charge up to the trigger voltage on tube 40, when contact D' is closed and only half the limiting resistance 72 is in series with capacitor 66, then it would take 20 seconds to build up to the same trigger voltage if switch contact D' is open and both of the squal resistance sections 73 and 74 were in series with capacitor 66 for the entire charging period. Similarly, for any portion of the charging period of capacitor 66 during which contact D' is closed, the charging rate of capacitor 66 will be twice as great as during the portions of the charging period when contact D' is open.

In accordance with the invention, the relationship of the opening and closing of contact D' to the total time required to charge capacitor 66 to the trigger voltage of tube 40 is used to measure the length of a pipe or the like which is to be cut and to so control the charging period of capacitor 66 as to cause the trigger voltage on grid 46 of the tube 40 to be reached after an interval such that the clamping and cutting action will occur precisely when the midpoint of the pipe reaches the cutter, thereby to cut each pipe into two equal lengths. The timing and control circuit of FIG. 2 operates to cut the pipe into two equal lengths as long as the length of the pipe is between the minimum length for which the S and D switches are set, at one extreme, and twice the minimum length at the other extreme. Thus, for example, if the S and D switches are set for a minimum pipe length before cutting of 100 feet, the timing and control circuit will cut the pipe into two equal lengths as long as the pipe length before cutting is in the range 100 feet–200 feet.

Several specific examples of the operation of the timing circuit of FIG. 2 now will be described. Assume first that a pipe exactly 100 feet in length is to be cut in half. As will be seen from FIG. 3, the 100-foot pipe exactly spans the length between the S switch adjacent the leading end of the pipe and the D switch adjacent the trailing end of the pipe. Assume that the pipe travels longitudinally on the rolls 18, 20, and 22 at a constant speed of 5 feet per second. Assume that the value of the limiting resistors 73 and 74 has been adjusted so that with both resistor sections 73 and 74 connected in series with capacitor 66 for the entire charging period the time required to charge capacitor 66 to the trigger voltage of tube 40 is 20 seconds whereas only 10 seconds is required to charge capacitor 66 to the trigger voltage of tube 40 if only resistor section 73 is in series with capacitor 66 for the entire charging period of capacitor 66. The minimum length of pipe to be cut and the rate of movement of the pipe are factors in selecting the resistance and capacitance values which control the charging time required to reach the trigger voltage on the thyratron tube.

Figure 3:
FIG. 3 is a schematic view showing the relation of the pipe which is to be cut into two equal lengths to the S and D control switches when the pipe to be cut is just equal in length to the minimum length of pipe to be cut for the given setting of the S and D switches.

As soon as the leading end of the 100-foot pipe P in FIG. 3 reaches the S switch, switch S actuates the S relay to open contact S' to permit capacitor 66 to begin charging through the limiting resistance. Since at the same instance that the leading end of pipe P reaches switch S, the trailing end of the pipe is just passing out of contact with switch D at the trailing end of the pipe, contact D' controlled by relay D is closed and shunts out resistor section 74. Resistor 73 and capacitor 66 have their values so related that when the charging circuit is only through resistor 73 for the entire charging period, capacitor 66 will be charged to the trigger voltage of tube 40 in 10 seconds. During this 10-second period, which begins when the leading end of pipe P actuates switch S, the pipe will move 50 feet beyond the S switch and beyond the cutter, since the rate of movement of the pipe is 5 feet per second. Thus, at the end of the ten second interval required to charge capacitor 66 with only resistor 73 in circuit, tube 40 will fire and current conduction in the circuit of anode 42 will energize operating coil 52 of output relay 50. Energization of coil 52 will close normally open relay contacts 53 and 54 which are respectively in the electrical circuit of the clamps 30 and cutter 58 to energize elements, such as solenoids 56 and 57, in the respective electrical circuits of clamps 30 and cutter 58. The energization of the electrical circuits of the clamps and cutter causes the clamps to clamp the moving pipe against movement and causes the cutter to cut the pipe in two equal lengths. Upon completion of the cutting operation, contact 64 is closed by cutter 58 to energize operating coil 61 of reset relay 60. Energization of reset relay coil 61 opens normally closed contact 62 in the circuit of anode 42 thereby to reestablish control of the tube 40 by grid 48 to reset the timing circuit for the next timing operation.

Now, assume that a pipe 110 feet long is to be cut rather than the 100-foot pipe previously described. Assume, as before, that the pipe is moving at a constant rate of speed of 5 feet per second. In this case, when the leading end of the pipe causes the opening of the S' contact to begin charging of capacitor 66, the trailing end of the pipe still extends 10 feet rearwardly of the D switch. Hence, since the rate of movement of the pipe is 5 feet per second, it will take the training end of the pipe 2 seconds to reach the D switch. During the 2 seconds that the trailing end of the pipe is moving to reach the D switch, the D' contact is maintained open by the D relay controlled by the D switch. With the D' contact open, both of the equal resistor sections 73 and 74 are in series with the capacitor 66 for a period of 2 seconds. Hence, during this 2-second integral the capacitor 66 is charging at one-half the rate that it would if only the resistor 73 were in series therewith.

It can be shown that the total time required to charge capacitor 66 to the trigger voltage of the thyratron tube can be calculated according to the following formula:

$$T_a = T_1 + \frac{T - T_1}{2}$$

where $T_a$ is the actual total charging time required to reach the trigger voltage of the thyratron tube 40

$T_1$ is the time during the charging period during which both the equal resistor sections 73 and 74 are connected in the charging circuit of capacitor 66

$T$ is the charging time required to reach the trigger voltage of tube 40 if both resistor sections 73 and 74 were in the charging circuit for the entire charging period.

Since in the assumed example, the pipe to be cut is 110 feet in length, $T_1$, the time during the charging period during which both resistors 73 and 74 are connected in the charging circuit, is 2 seconds, since 2 seconds are required for the 10 feet of the pipe which projects beyond the D switch to pass the D switch, during which 2-second period the D switch remains open to cause both resistors 73 and 74 to be connnected in the charging circuit of capacitor 66. $T$ is assumed to be 20 seconds in the assumed example.

Substituting the values just given into the equation:

$$T_a = 2 + \frac{20-2}{2} = 2 + 9 = 11$$

Therefore, solution of the equation indicates that 11 seconds charging time is required to charge the capacitor 66 to the trigger voltage of tube 40, at the end of which interval tube 40 becomes conducting to energize output relay 50 to actuate clamps 30 and cutter 58. Since by definition the pipe is moving at the rate of 5 feet per second, the pipe would have moved 55 feet beyond the S switch at the time the thyratron tube 40 fired, which would be the exact midpoint of the 110 foot length of the pipe. Thus, it can be seen that the timing circuit automatically computes the length of the pipe and causes the actuation of the clamping and cutting devices at the time the exact midpoint of the pipe reaches the cutter.

Reference now is made to FIG. 5 which shows a complete schematic of the circuit used for dividing pipe lengths and the like into two equal lengths. The power supply for the timer circuit is derived from an alternating current input supply which may have, for example, a voltage rating of 117 volts. The input voltage is applied to the primary winding 102 of a transformer generally indicated at 100. The voltage of transformer secondary winding 104 is applied across a voltage doubling circuit including capacitors 106 and 108 and silicon diode rectifiers 110 and 112. The D.C. output voltage of the voltage doubling circuit is derived at terminals 114 and 116 and is applied to a voltage regulating circuit including a limiting resistor 118 and a plurality of series-connected neon bulbs generally indicated at 120 which maintain a constant output voltage across their terminals. The timing capacitor 126 which is to be charged is connected across the output terminals 122 and 124 of the neon voltage regulator tubes 120 in series with four current limiting resistors 128, 130, 132, and 134. Adjusting taps 136 are provided for the resistors 130 and 132 to provide adjustment of the resistance values when required.

The normally closed D' contact is connected in shunting relation to resistors 132 and 134 which are of equal magnitude to the resistors 128 and 130, so that when the D' contact is in its normally closed position only one-half of the total resistance value of resistors 128–130–132–134 is included in series with capacitor 126.

The normally closed S' contact is connected in parallel shunting relation to timing capacitor 126 so that when the S' contact is in normally closed position, timing capacitor does not charge.

The thyratron gas tube 140 includes an anode 142, a cathode 144, and a control grid 146. Control grid 146 is connected to one terminal of capacitor 126 in series with a neon bulb 148 which conducts only when a predetermined voltage such as 60 volts is applied across its terminals. A bias voltage is supplied to control grid 146 from secondary winding 152 of a transformer 150, the primary winding 151 of transformer 150 being connected to the secondary winding 105 of supply transformer 100. The biasing voltage supply circuit for grid 146 includes a voltage doubling circuit having capacitors 154 and 156 and diode rectifiers 158 and 160 connected across the secondary winding 152 of transformer 150. A voltage regulating neon bulb 162 is connected across the output terminals of the voltage divider in series with a current limiting resistor 164. Neon bulb 162 provides a stable D.C. voltage output which is applied in series with resistors 166 and 168 across bias resistors 170 and 172 which control the bias voltage of control grid 146.

Current conduction occurs through neon bulb 148 only when the voltage across bulb 148 builds up to a certain value, such as 60 volts. The instant that neon bulb 148 becomes conductive, a positive pulse is applied to the grid 146 of thyratron tube 140 to cause the tube to fire thereby to energize output relay 190. If the voltage across the resistors 170 and 172 is adjusted, for example, to 30 volts, the voltage across the capacitor 126 need build up to only 30 volts because the voltages across timing capacitor 126 and across resistors 170 and 172 are in series across neon bulb 148. Thus, if the voltage across resistors 170 and 172 is 30 volts, then 30 volts voltage drop across capacitor 126 is sufficient to discharge neon tube 148 to apply a positive pulse to grid 146 to cause firing of tube 140.

The anode 142 of tube 140 derives its D.C. voltage supply from a voltage doubler circuit supplied from secondary winding 178 of transformer 150, the voltage doubler circuit including capacitors 180, 182, and diode rectifiers 184 and 186.

The operation of the circuit in accordance with the complete schematic diagram of FIG. 5 is substantially like that described in connection with the simple schematic diagram of FIG. 2. When the leading end of the pipe to be cut moves adjacent the S switch, the S relay is actuated to cause normally closed contact S' to open to permit capacitor 126 to start charging. The rate of charging of capacitor 126 depends upon whether or not the D' contact, which is in shunt with resistor sections 132 and 134, is open or closed, as previously explained. This, in turn, depends upon how much of the length of the pipe to be cut projects beyond the D switch, all as previously explained. When the voltage on capacitor 126 reaches a value such that this voltage plus the voltage across biasing resistors 170 and 172 is sufficient to cause conduction through neon bulb 148, neon bulb 148 fires and thus applies a positive pulse to the control grid 146 of the thyratron tube 140. Upon firing of tube 140, the output relay 190 in the circuit of anode 142 is energized thereby to actuate contacts in the cutter control circuit and in the clamp control circuit to cause clamps 30 to clamp the pipe and to cause the cutter to cut the pipe at its midpoint. Upon completion of the cutting operation, the reset relay circuit is energized to open normally-closed contact 192 in the anode circuit of tube 140 thereby to reset the tube for another cycle of operation.

Figure 6:
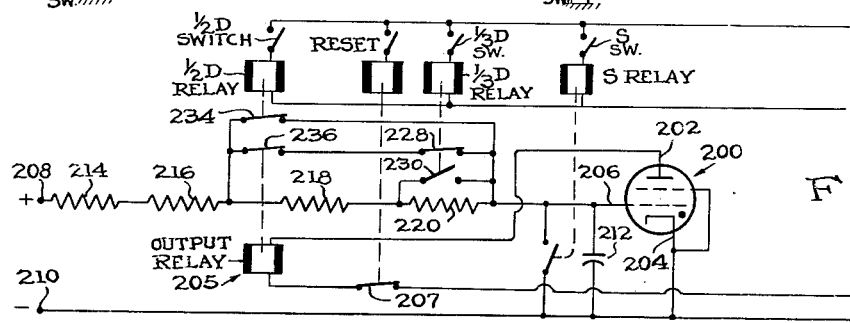
FIG. 6 is a simplified circuit diagram of a timing circuit used for subdividing a longitudinally moving pipe or the like into three equal lengths where the pipe moves at a constant speed.
Figure 7:
FIG. 7 is a schematic view showing the relation of the pipe to be cut to the S switch and to the ½D and ⅓D switches when the pipe which is to be cut into three equal lengths is just equal in length to the minimum length of pipe to be cut for the given setting of the S and ½D and ⅓D switches.

While the timing circuit and the position of the S and D switches shown in the embodiment of FIG. 5 have been arranged to control cutting of the pipes or other moving material into two equal lengths, the timing circuit and the position sensing switches also may be arranged to cause some other fraction of the total length of the pipe to be cut if desired. FIGS. 6 and 7 show the circuit of the timing device and the location of the position sensing switches used when the pipe or other moving material is to be cut into three equal lengths. In using the timing circuit of FIG. 6 to cut a pipe into three equal lengths, the maximum length of the pipe to be cut must not exceed 150 percent of the minimum length of the pipe to be cut.

In cutting the pipe or the like into three equal lengths, three switches are used to sense the position of the pipe relative to the cutter, namely the S switch, the ½D switch, and the ⅓D switch. Each of these switches is connected in series with a relay, these relays being respectively indicated as the S relay, the ½D relay, and the ⅓D relay. The S switch is positioned at the same point along the path of movement of the pipe as the cutter, and is first actuated by the leading end of the pipe, as described in the previous embodiments. The ⅓D switch is positioned a distance from the S switch equal to the length before cutting of the shortest pipe which is to be cut. Thus, if a pipe having a minimum length of 100 feet is to be cut into three equal lengths, the ⅓D switch is positioned 100 feet from the S switch in the direction of the trailing end of the pipe. The ½D switch is positioned a distance from the S switch equal to two-thirds the distance of the ⅓D switch from the S switch or, in the example shown in FIG. 7, the ½D switch is positioned a distance of 66⅔ feet from the S switch.

The ⅓D relay, operated by the ⅓D switch, controls a normally closed contact 228 and a normally open contact 230, the connection of which will be explained hereinafter. The ½D switch controls the actuation of a normally closed contact 234.

The timing circuit shown in FIG. 6 for timing the cutting of a pipe into three equal lengths includes a thyratron gas tube generally indicated at 200, including an anode 202, a cathode 204, and a control grid 206. An output relay 205 is connected in the circuit of anode 202 to operate contacts in the electrical circuits of the clamps and cutter as previously described in connection with the embodiments of FIGS. 2–5. A reset contact 207 also is connected in the circuit of anode 202 as previously explained. A capacitor 212 is connected between control grid 206 and cathode 204, and a normally closed S switch is connected in parallel with capacitor 212. Four resistor sections 214–216–218–220 each of equal magnitude are connected in series with capacitor 212 across the terminals 208 and 210 of a regulated constant D.C. voltage supply.

As seen in FIG. 6, two shunt paths are provided in parallel with each other across the two series-connected resistor sections 218–220, these two resistor sections comprising one-half of the total resistance of resistor sections 214–216–218–220. The first of these shunt paths includes the normally closed contact 228 which is operated to open position when the ⅓D relay is energized by the presence of the pipe adjacent the ⅓D switch. Contact 228 is connected in series in the first shunt path with a normally closed contact 236 which is actuated to open position upon the energization of the output relay 205 in the circuit of anode 202 of thyratron tube 200. The second shunt path across resistor sections 218–220 includes the normally closed contact 234 which is actuated to open position when the ½D relay is energized by the presence of the pipe adjacent the ½D switch.

A separate shunt path is provided across resistor section 220 by normally open contact 230 which is operated to closed position when the ⅓D relay is energized by the presence of the pipe adjacent the ⅓D switch.

The timing circuit of FIG. 5 and the position sensing switches shown in FIG. 6 cooperate to effect the division of the pipe into three equal lengths in two separate measuring and cutting operations, as follows:

(1) Measurement of the pipe to determine when ⅓ of the length thereof has passed by the cutter, and actuation of the clamps and cutter to make a cut at a point corresponding to ⅓ of the length of the original pipe.

(2) Measurement of the length of the remaining ⅔ of the original pipe length and actuation of the clamps and cutter to make a cut at the midpoint of the remaining ⅔ of the pipe length, or, in effect, cutting the remaining ⅔ of the pipe length into two equal lengths. This portion of the cutting operation involves use of a timing circuit similar to that used in the embodiment of FIGS. 2–5.

The shunt path connections across the limiting resistor 220 and across resistors 218–220 established by the selective opening and closing of the various contacts 228–230–234–236 permits the completion of the two sequential steps just described and provides what might be termed a dual ratio timing device.

In explaining the operation of the circuit of FIG. 5, it will first be assumed that a pipe having a length greater than 100 feet is to be cut into three equal lengths, and that the pipe moves along the conveyor rolls at a constant rate of speed of 5 feet per second. It is also assumed that the position sensing switches are set for a minimum length of pipe, before cutting, of 100 feet, with the ⅓D switch being positioned 100 feet from the S switch, and with the ½D switch being positioned 66⅔ feet from the S switch and 33⅓ feet from the ⅓D switch.

*Cutting the first one-third of the pipe*

With the conditions as just assumed, when the leading end of the pipe has moved along the conveyor rolls to a point where it is opposite the S switch, the trailing end of the pipe is still at a point beyond the ⅓D switch. When the leading end of the pipe is adjacent the S switch, the S switch is actuated to energize the S relay to open the S' contact connected in parallel with capacitor 212, thereby to permit charging of capacitor 212 to begin. Since, at the same time, the pipe also is moving adjacent the ½D switch and the ⅓D switch and extends beyond the ⅓D switch, both the ½D switch and the ⅓D switch are actuated to energize the ½D relay and the ⅓D relay. Energization of the ½D relay opens the normally closed contact 234 to open one of the shunt paths across resistor sections 218 and 220. Energization of the ⅓D relay opens the normally closed contact 228 to open the other shunt path across resistor sections 218–220. Energization of the ⅓D relay also closes the normally open contact 230. Thus, both of the shunt paths across resistor sections 218 and 220 are open, but the shunt path across resistor section 220 through contact 230 is closed. Therefore, with both the ⅓D relay and the ½D relay energized, the current flow to charge capacitor 212 is through limiting resistors 214–216–218.

After the pipe has moved beyond the ⅓D switch but is still in contact with the ½D switch, and assuming that the charge on capacitor 212 has not reached the trigger voltage of the thyratron tube, the ⅓D switch is deactivated to deenergize the ⅓D relay, thereby to open contact 230 and close contact 228. Also, since the pipe by definition must be within the length limits of 100–150 feet, assuming that the minimum length is 100 feet in the example, the trailing end of the pipe will not reach the ½D switch before the first one-third cut is made. Therefore, during the entire interval before the first one-third cut is made, the ½D relay remains energized to maintain contact 234 open. Thus, when the trailing end of the pipe has passed the ⅓D switch but has not reached the ½D switch, and assuming that thyratron tube 200 has not fired, the shunt path through contact 230 is open and the shunt path through contact 234 is open. However, the shunt path through the series-connected contacts 228–236 is closed, thereby causing resistor sections 218 and 220 to be shunted. Thus, the charging circuit to capacitor 212 under these conditions is through resistor sections 214 and 216. This causes the ratio of the charging current to capacitor 212 to be 1.5 times as great as it was when the charging circuit was through resistor sections 214–216–218.

To summarize, if the length of the pipe is greater than the minimum length of pipe to be cut, and not greater than one and one-half times the minimum length, both of the following conditions may occur during the first one-third of the travel of the pipe:

(1) With the pipe adjacent both the ⅓D switch and the ½D switch, the ⅓D relay and the ½D relay are both energized. With both of these relays energized, the only shunt path is through closed contact 230 which shunts out resistor section 220, thereby causing the capacitor 212 to be charged through resistor sections 214, 216, and 218.

(2) If the pipe has passed the ⅓D switch, but is still in contact with the ½D switch, and one-third of the length of the pipe has not yet passed the S switch to cause firing of thyraton tube 200, only the ½D relay will be energized. With this condition of the relays, contact 230 of the ⅓D relay will be open and contact 228 of the ⅓D relay will be closed, and contact 234 of the ½D relay will be open. Therefore, the shunt path will be closed through contacts 236 and 228 across resistor sections 218 and 220. This causes capacitor 212 to be charged through resistor sections 214 and 216, and the current flow through these two resistor sections will have a ratio of 1.5 to 1 to the current flow which occurred through the three resistor sections 214, 216, and 218. Therefore, capacitor 212 will charge 1.5 times as fast during the period of the first ⅓ cut when the pipe has passed out of contact with the ⅓D relay as it did when the pipe was still passing adjacent the ⅓D relay.

When the capacitor 212 finally becomes charged to a potential sufficient to trigger the firing of thyraton tube 200, the current flows through output relay 205 and closes contacts in the control circuits for the clamps and for the cutter to cause the pipe to be clamped and to cause the cutter to cut the pipe at one-third of its length. When the cutting operation is completed, the cutter closes a contact which energizes a reset relay to open the reset contact 207 in the anode circuit of tube 200, as previously explained in connection with the embodiment of FIGS. 2–5. Also, the energization of the output relay 205 opens the contact 236 in series with normally closed contact 228 of the ⅓D relay. The operation of contact 236 is such that it does not revert to closed position when thyratron tube 200 stops conducting, but instead must be reset to closed position by appropriate means when the next pipe is to be cut.

*Cutting the remaining ⅔ of the pipe in half*

Upon the opening of reset contact 207 at the completion of the cutting and clamping operation to cause deenergization of the thyratron tube, the cutter is retracted from cutting position and the clamps are released from clamping engagement with the pipe. The pipe which has now had one-third of its length severed begins to move again. The circuit of FIG. 5 now provides a timing and control action which causes the remaining two-thirds of the pipe to be cut into two equal lengths, thus resulting in a severing of the original pipe into three equal lengths.

Since the ⅓D switch is open due to the fact that the pipe, being within the length limits previously specified and already having ⅓ of its length severed therefrom, can no longer be adjacent the ⅓D switch, the ⅓D relay is deactivated to close contact 228 and to open contact 230. However, if the original length of the pipe was greater than the minimum length, the pipe after the first ⅓ cut still would be adjacent the ½D switch to continue actuation of the ½D relay and to maintain contact 234 open. With contacts 230, 234, and 236 all open as just described, all of the shunt paths across resistor sections 218 and 220 are open.

Thus, for the portion of the length of the remaining two-thirds of the original pipe length which projects beyond the ½D switch, all four resistors 214, 216, 218, and 220 are in the charging circuit of capacitor 212. As soon, however, as the trailing end of the pipe passes the ½D switch, the ½D relay is deenergized, causing the normally closed contact 234 to reclose, thereby establishing a shunt circuit across resistor sections 218 and 220. With contact 234 closed, only resistor sections 214 and 216 which have a resistance equal to one-half the value of the total resistance 214–216–218–220 are in the charging circuit of capacitor 212, and the capacitor 212 therefore charges at twice the rate that it did when the shunt circuit through contact 234 was open. When the capacitor 212 becomes charged to the trigger voltage of tube 200, the tube fires and energizes relay 205 to cause actuation of the clamps and of the cutting device as previously explained, thereby to effect the cutting of the remaining two-thirds of the length of the pipe into equal halves. Thus, by the use of the dual ratio timing circuit hereinbefore described, the pipe first has one third of its length cut off and then the remaining two-thirds of the length is cut in half.

Figure 4:
FIG. 4 is a schematic view showing the relation of the pipe to be cut to the S and D switches when the pipe length before cutting exceeds the minimum length of pipe to be cut for the given setting of the S and D switches.

There is shown in FIG. 8 a dividing timer circuit employed when the material to be cut advances at a variable speed and it is required to divide the material into predetermined fractional lengths. The variable speed timing circuit operates generally in accordance with the same principles as the constant speed timing devices hereinbefore described, but additionally has features which compensate for the variable speed of the moving material such as the pipe or the like. The circuit shown in FIG. 8 is intended to time the cutting of a pipe or the like into equal halves and cooperates with S and D switches positioned as shown in FIGS. 3 and 4.

The variable speed timer circuit derives its input power from an alternating current power supply connected to the primary winding 302 of the transformer generally indicated at 300. The secondary winding 304 of the transformer 300 is connected to a voltage doubling circuit including capacitors 306 and 308 and diode rectifiers 310 and 312. The D.C. output of the voltage doubling circuit is applied to a voltage regulator generally indicated at 314 formed by a plurality of series-connected neon bulbs. The constant D.C. voltage output of the voltage regulator 314 is connected in series with load resistance 315 across the anode 317 and cathode 318 of a thyratron tube generally indicated at 316. Tube 316 also includes a control grid 319. Connected in shunt relation to the anode-cathode circuit of thyratron tube 316 and in series with diode rectifier 324 and choke coil 328 are two series-connected capacitors 320 and 322 of equal capacitance value. The output end of the two series-connected capacitors 320 and 322 at the junction 327 with diode rectifiers 324 is connected through diode rectifiers 323 to timing capacitor 325.

The S' contact, operated by the S switch through the S relay is connected in parallel shunt relation with capacitor 325 in the same manner as described in the previous circuits, the S' contact normally being closed to shunt out capacitor 325 to prevent charging thereof when the pipe to be cut is not in proximity to the S switch, and being actuated to open position to permit charging of the capacitor 325 when the pipe is in proximity to the S switch.

The variable speed timing circuit of FIG. 8 also includes a second thyratron tube generally indicated at 328, including an anode 330, a cathode 332, and a control grid 334. One end of timing capacitor 325 is connected to control grid 334 through a neon bulb 336 which functions in the same manner as described in connection with the circuit diagram of FIG. 5 to trigger the firing of the thyratron tube. The opposite end of capacitor 325 is connected to cathode 332 through a variable resistor 338. The voltage supply for anode 330 and the biasing voltage supply circuit for grid 334 are all substantially as described in the embodiment of FIG. 5 and will not be described again.

In accordance with the principle of operation of the circuit of the variable speed timer of FIG. 8, the regulated constant D.C. voltage across the output of the voltage regulator tubes 314 is pulsed by thyratron tube 316 through the capacitors 320 and 322, and the pulses are accumulated or added up on the capacitor 325 because of the blocking action of silicon diode rectifiers 323 and 324 which are poled in such manner as to permit discharge of capacitor 325 only through neon bulb 336 and thyratron tube 328 when neon bulb 336 and tube 328 fire. Diode rectifiers 323 are connected in series between the output end 327 of the series-connected capacitors 320 and 322 and the terminal 329 of timing capacitor 325.

An auxiliary circuit generally indicated at 340 in FIG. 8 is provided to vary the number of pulses supplied by thyratron tube 316 in proportion to the linear speed of the material being divided. This auxiliary circuit will now be described. The auxiliary circuit derives its power from a secondary winding 342 on input power supply transformer 300. Secondary winding 342 supplies power through a transformer 344 to a voltage doubling circuit including condensers 346 and 348 and silicon diodes 350 and 352. The output voltage from the voltage doubling circuit is fed through a limiting resistor 353 to a voltage regulator including a plurality of series-connected Zener diodes 354. The constant regulated D.C. voltage supplied by Zener diodes 354 is connected across a potentiometer 356. A capacitor 358 has one of its ends connected through resistors 364 and 365 to an adjustable tap on potentiometer 356, the opposite end of capacitor 358 being connected across the opposite end of the potentiometer. A neon bulb 370 is connected in series with the primary winding 372 of a transformer whose secondary winding 374 is connected in the input circuit of control grid 319 of thyratron tube 318. The voltage across neon bulb 370 which is derived from the input voltage supply is adjusted principally by the adjustable tap of potentiometer 356 to provide a voltage across neon bulb 370 just below its firing voltage. A small additional voltage is connected across the input to neon bulb 360, preferably across the resistances 364-365, this additional voltage being derived from a pulse generator source having a pulse frequency which is indicative of the linear speed of the moving pipe or rod. For example, a tachometer generator may be attached to any one of the roll members 18, 20, 22 on which the pipe moves past the cutter, the tachometer generator being driven at a speed which is proportional to the rate of movement of the conveyor rolls and hence of the rate of movement of the pipe to be cut. The tachometer generator has a voltage characteristic such that once in each cycle of its output voltage, a voltage peak is reached which is sufficient to cause firing of neon bulb 370. Each discharge of capacitor 358 through neon bulb 370 provides a pulse of current through the primary winding 372 which is transferred to the secondary winding 374 in the input circuit of control grid 319 of thyratron tube 316. The frequency of these pulses is a function of the rate of rotation of the tachometer generator and hence of the linear speed of the pipe or the like moving along the roll conveyor.

Each voltage pulse on secondary winding 374 reaches control grid 319 of tube 316 through capacitor 366 which is in series with secondary winding 374 in the input circuit to grid 319. This voltage pulse causes tube 316 to fire, connecting the regulated D.C. voltage supply across load resistor 315 and causing a discharge of capacitors 320 and 322 between the anode and cathode of tube 316. Although tube 316 is a thyratron tube, the circuit constants are such that tube 316 does not continue to fire as a thyratron tube normally does because the current through it is too small to maintain ignition, but instead tube 316 instantly reverts back to open circuit condition once capacitors 320 and 322 have discharged therethrough. Tube 316 is maintained in open circuit condition by the bias voltage across resistor 368 until another pulse from secondary winding 374 causes tube 316 to fire again.

Each time that tube 316 reverts to its open circuit connection at the end of each pulse from secondary winding 374, it applies a voltage across the discharged capacitors 320 and 322 through diode rectifiers 324, causing capacitors 320 and 322 to recharge. Each time a pulse of charging current flows through diode rectifiers 324 and choke coil 328 to recharge capacitors 320 and 322, an additional increment of charge is applied to capacitor 325. Thus, capacitor 325 stores a quantity of equal charges thereon, the quantity being equal to the number of pulses from the tachometer generator or other pulse generator, which, in turn, is a function of the speed of the moving material.

When the voltage on capacitor 325 reaches a predetermined value due to the accumulation of incremental charges thereon as just explained, the predetermined voltage value required also depending upon the voltage drop across resistors 338 and 339 as described in connection with the embodiment of FIG. 5, neon bulb 336 in series with the input to control grid 334 of the thyratron tube 329 will fire. The firing of neon bulb 336 applies a pulse to the control grid of tube 328 which causes thyratron tube 328 to fire to actuate the output relay in the anode circuit of tube 328 to control the clamping and cutting operations in the same manner as previously described in connection with the other embodiments of the invention.

With the S and D switches positioned in the same relative positions as in the diagrams of FIGS. 3 and 4, corresponding to a cutting of the pipe into two equal lengths, the S switch will be actuated to open the S' contact through the S relay when the leading end of the pipe to be cut passes adjacent the S switch. The S' contact will remain open as long as the pipe is passing adjacent the S switch. Opening of the S' contact permits capacitor 325 to become charged, as explained in connection with the previous embodiments, although in the circuit of FIG. 8, the capacitor 325 is not charged through limiting resistors as in the previous embodiments, but rather is charged by a succession of equal incremental pulses as previously explained.

When the pipe to be cut projects rearwardly of the D switch, as shown in FIG. 4, the D switch is actuated to open contact D' through the D relay, to cause both capacitors 320 and 322 to be connected in series. With both capacitors 320 and 322 connected in series with each other, the total capacitance of the two series-connected capacitors is one-half what it would be with only one of these two identical capacitors in the circuit, with the result that the recharging pulses to capacitors 320-322 are each only half as large as they would be if only capacitor 320 were in the circuit. Hence, the rate of charging of capacitor 325, which is controlled by the recharging pulses to capacitors 320-322, is only one-half what it would be if only capacitor 320 were in circuit.

When the pipe passes the D switch, the D' contact is closed by the D relay to bypass capacitor 322, with the result that only capacitor 320 is in circuit. This causes the charging rate of capacitor 325 to double as compared to the rate when both capacitors 320 and 322 were in circuit, causing timing capacitor 325 to charge up to a predetermined voltage twice as fast as previously.

Thus, the action of the D' contact and its bypassing relation to capacitor 322 to permit doubling the charging rate to capacitor 325 when capacitor 322 is shunted by the D' contact, provides the same type of timing action to cause the cut to be made exactly at the midpoint of the pipe, as that described in connection with the constant speed timing circuits of FIGS. 2 and 5, in which resistors were used instead of capacitors to control the charging rate on the timing capacitor which accumulates charges to trigger the firing of the thyratron tube. The variable speed timing circuit of FIG. 8 additionally compensates for the variable rate of speed of the moving material by controlling the frequency of the pulses to capacitors 320 and 322 and hence determines the rate of increase of the charge on the timing capacitor 325.

The timing circuit shown in FIG. 8 is very flexible in its operation and the variable capacitors 320-322 may be adjusted so that the total number of pulses required to raise timing capacitor 325 to the trigger voltage may vary over a wide range, as, for example, from one pulse to several thousand pulses. The unit is capable of responding to an input pulse rate from a pulse source over a wide range of frequencies, such as the range of four pulses per minute to 100 pulses per second. The pulses received by the timing circuit may be of any wave form or shape from a wave shape having a smooth slow rise and fall to a sharp spiked pulse with a duration as short as one millisecond or less. In an operational embodiment, the pulses feed into an impedance of 50K ohms and can be of any voltage from a minimum of 2 volts to a maximum of 100 volts without series resistance being added. Resistance of the order of 10K ohms per volt for the lowest pulse voltage expected may be added in series with the pulse source and will not change the counting accuracy but will relieve the internal pulse circuit of unnecessary strain.

Since the pulses feeding the timing circuit of FIG. 8 may be of a wide variety of voltages and wave shapes without causing an error in the count, almost any type of pulse generator may be used, including the simple A.C. tachometer generator previously referred to. The pulse source may also include pulses or light or radiation from a hot moving object which could be picked up by a variable resistance device such as a phototube or a silicon photodiode to supply pulses indicative of the rate of movement of the moving material.

The variable speed timer can measure accurately for cutting a pipe of known or unknown length traveling at a varying speed, even a pipe which is stopping and restarting.

By adjusting the capacitance value of the adjustable capacitor 322 relative to capacitor 320, the change in pulse value when contact D' is closed compared to the pulse value when it is open may be used to adjust the apparatus for different fractional cuts, as, for example, the one-third cut described in the embodiment of FIGS. 6 and 7. This modification would also involve a placement of the S and D switches in positions similar to those shown in FIG. 7.

Any of the timing devices hereinbefore described may be used to cut a predetermined fixed length of pipe rather than a predetermined fractional length of pipe. This may be done by eliminating or disconnecting the D switch and the contacts controlled thereby and using only the S switch which is first actuated by movement adjacent thereto of the leading end of the pipe. In such case, the circuit constants, whether they be the resistor sections of FIGS. 2, 5, and 6, or the capacitors of the variable speed embodiment of FIG. 8, are so adjusted with respect to the timing capacitor and are so correlated with respect to the speed of movement of the pipe and the characteristics of the thyratron tube, as to cause the thyratron tube to fire when a predetermined fixed length of pipe has passed by the S switch and by the cutter.

In any of the various embodiments described for cutting predetermined fractional lengths, such as cutting a pipe into two equal lengths or three equal lengths, the timing and control circuit will always operate in such manner as to cut at least one usable fractional length out of a given length of pipe, even though the total pipe length before cutting is insufficient to cut into the total number of fractional parts. Thus, for example, in the embodiment of FIGS. 2–5, in which the pipe is cut into two equal lengths, assume that a pipe moves along the conveyor rolls toward the pipe cutter which is too short in its total length to be cut into two minimum 50-foot lengths. Thus, assume that a pipe 80 feet long moves along the conveyor rolls where the minimum length before cutting for which the S and D switches are set is 100 feet. It will be clear from the previous description given that the movement of the pipe past the S switch will start the timing circuit in operation in such manner as to cause a cut to be made at the end of 50 feet of movement of the 80-foot pipe, leaving a piece remaining which is 30 feet in length. This is an improvement over prior art apparatus in which pipe having a length before cutting less than the required minimum length is sometimes cut into two equal lengths each of which is shorter than the required minimum length after cutting.

Similarly, in the case of the embodiment of FIGS. 6 and 7, where the timing device functions to cut a pipe length into three equal lengths, assume that a pipe having a length of less than 100 feet moves toward the cutter. It will be clear from the description previously given that the timing and control system of FIGS. 6 and 7 will operate first to cut a piece equal to the minimum one-third fractional length, namely, a section 33⅓ feet in length, during the first of the two separate measuring and cutting operations previously described in connection with the embodiment of FIGS. 5 and 6. The timing circuit will then switch over to its connections for the second step in which the length of the pipe remaining after the first one-third cut has been made is cut to provide a second minimum one-third fractional length, if the pipe is sufficiently long to permit two such cuts to be made. Thus, out of the total length of pipe, at least one, and possibly two useful one-third length sections will be provided, depending upon the length of the pipe.

It can be seen from the foregoing that there is provided, in accordance with this invention, an electronic timing and cutting apparatus and method which have great utility, particularly in connection with cutting of moving material, such as pipes, rods, extrusions, and the like into predetermined fractional lengths or into predetermined fixed lengths.

The apparatus of the invention does not require a high initial investment, as in the case of most prior art apparatus for the same purpose, and presents very little in the way of maintenance problems. The apparatus can be used for either cutting moving material into predetermined fractional lengths or into repeating fixed lengths, as required. The timing and control apparatus are efficient and uncomplicated in their operation and permit the use of relatively simple controls for adjusting the apparatus for varying operating conditions. The timing and cutting apparatus also insures that when the moving material is less than the minimum length required to provide a plurality of cuts of minimum length, the material will be cut in such manner as to provide one or more usable fractional lengths, rather than a plurality of fractional lengths, none of which is equal to the minimum length required.

While there have been shown and described particular embodiments of the invention, it will be apparent to those skilled in the art that various changes and modifications may be made therein without departing from the spirit of the invention and, therefore, it is aimed to cover all such changes and modifications as fall within the true spirit and scope of the invention.

What I claim as my invention is:

1. An apparatus for measuring a predetermined fractional length of longitudinally moving material, comprising a timing circuit including an electrical capacitor in circuit with a current limiting impedance, means connecting said timing circuit to a source of charging current, means actuated by said capacitor when the electrical potential on said capacitor is raised to a predetermined value, a first sensing means responsive to the presence of the moving material to connect said capacitor in said timing circuit to initiate the charging of said capacitor, at least one additional sensing means to sense the length of said moving material, and means connecting said additional sensing means to said timing circuit to modify the electrical characteristics of said timing circuit as a function of the length of said moving material whereby the time required for the electrical potential of said capacitor to be raised to said predetermined value is a function of the length of said moving material.

2. An apparatus for measuring a predetermined fractional length of longitudinally moving material, comprising a timing circuit including an electrical capacitor in circuit with a current limiting impedance, means connecting said timing circuit to a source of charging current, means actuated by said capacitor when the electrical potential on said capacitor is raised to a predetermined value, a first sensing means responsive to the presence of the moving material to connect said capacitor in said timing circuit to initiate the charging of said capacitor, at least one additional sensing means to sense the length of said moving material, and means connecting said additional sensing means to said timing circuit to vary the charging current as a function of the length of said moving material whereby the time required for the electrical potential of said capacitor to be raised to said predetermined value is a function of the length of said moving material.

3. An apparatus for measuring a predetermined fractional length of longitudinally moving material, comprising a timing circuit including an electrical capacitor in circuit with a current limiting impedance, means connecting said timing circuit to a source of charging current, means actuated by said capacitor when the electrical potential on said capacitor is raised to a predetermined value, said timing circuit having a first electrical characteristic applicable when the length of the material remaining to be measured is in excess of a predetermined minimum length and a second electrical characteristic applicable when the length of the material remaining to be measured is not in excess of said predetermined minimum length, the electrical potential on said capacitor rising to said predetermined value at a slower rate when said timing circuit has said first electrical characteristic than when it has said second electrical characteristic, a first sensing means responsive to the presence of the moving material to connect said capacitor in said timing circuit to initiate the charging of said capacitor, at least one additional sensing means to sense the length of said moving material remaining to be measured, and means connecting said additional sensing means in said timing circuit to cause said timing circuit to have either said first or said second electrical characteristic depending upon whether said length of material remaining to be measured is or is not in excess of said predetermined minimum length, whereby the time required for the electrical potential of said capacitor to be raised to said predetermined value is a function of the length of said moving material.

4. An apparatus for measuring a predetermined fractional length of longitudinally moving material, comprising an electrical capacitor, an electrical charging circuit for said capacitor, a current limiting impedance in said charging circuit, said impedance being adjustable to control the rate of charging of said capacitor, means actuated by said capacitor when the electrical potential on said capacitor is raised to a predetermined value, a first sensing means responsive to the presence of the moving material to connect said capacitor in said charging circuit to initiate the charging of said capacitor, at least one additional sensing means to sense the length of the moving material, and means connecting said additional sensing means to said impedance to adjust said impedance to control the rate of charging of said capacitor as a function of the length of the moving material.

5. An apparatus for measuring a predetermined fractional length of longitudinally moving material, comprising an electrical capacitor, an electrical charging circuit for said capacitor, said charging circuit including a plurality of current limiting impedances selectively connectible in said charging circuit to control the rate of charging of said capacitor, means actuated by said capacitor when the electrical potential on said capacitor is raised to a predetermined value, a first sensing means responsive to the presence of the moving material to connect said capacitor, at least one additional sensing means to sense the length of said moving material, and means connecting said additional sensing means to said current limiting impedances to selectively connect said impedances in the charging circuit to control the rate of charging of said capacitor as a function of the length of the moving material.

6. An apparatus for measuring a predetermined fractional length of longitudinally moving material, comprising an electrical capacitor, an electrical charging circuit for said capacitor, a first and a second current limiting impedance selectively connectible in said charging circuit to control the rate of charging of said capacitor, means actuated by said capacitor when the electrical potential on said capacitor is raised to a predetermined value, a first sensing means responsive to the presence of the moving material to connect said capacitor in said charging circuit to initiate the charging of said capacitor, at least one additional sensing means to sense the length of the moving material, and means connecting said additional sensing means to said first and second current limiting impedances to selectively connect said impedances in the charging circuit to control the rate of charging of said capacitor as a function of the length of the moving material.

7. An apparatus for measuring a predetermined fractional length of longitudinally moving material, comprising an electrical capacitor, an electrical charging circuit for said capacitor, a current limiting impedance in said charging circuit, said impedance being adjustable to control the rate of charging of said capacitor, an electrical discharge device, means connecting said capacitor to said electrical discharge device whereby an electrical discharge occurs through said discharge device when the electrical potential on said capacitor is raised to a predetermined value, a first sensing means responsive to the presence of said moving material to connect said capacitor in said charging circuit to initiate the charging of said capacitor, at least one additional sensing means to sense the length of said moving material, means connecting said additional sensing means to said impedance to adjust said impedance to control the rate of charging of said capacitor as a function of the length of the moving material, and means controlled by said discharge device upon discharge therethrough.

8. An apparatus for measuring a predetermined fractional length of longitudinally moving material, comprising an electrical capacitor, an electrical charging circuit for said capacitor, a plurality of current limiting impedances selectively connectible in said charging circuit to control the rate of charging of said capacitor, an electrical discharge device, means connecting said capacitor to said electrical discharge device whereby an electrical potential on said capacitor is raised to a predetermined value, a first sensing means responsive to the presence of the moving material to connect said capacitor in said charging circuit to initiate the charging of said capacitor, at least one additional sensing means to sense the length of said moving material, and means connecting said additional sensing means to said current limiting impedances to selectively connect said impedances in the charging circuit to control the rate of charging of said capacitor as a function of the length of the moving material, and means controlled by said discharge device upon discharge therethrough.

9. An apparatus for measuring a predetermined fractional length of longitudinally moving material, comprising an electrical capacitor, an electrical charging circuit for said capacitor, a first and a second current limiting impedance selectively connectible in said charging circuit to control the rate of charging of said capacitor, an electrical discharge device, means connecting said capacitor to said electrical discharge device whereby an electrical discharge occurs through said discharge device when the electrical potential on said capacitor is raised to a predetermined value, a first sensing means responsive to the presence of said moving material to connect said capacitor in said charging circuit to initiate the charging of said capacitor, at least one additional sensing means responsive to the presence of said moving material to sense the length of said moving material, and means connecting said additional sensing means to said first and second current limiting impedances to selectively connect said impedances in the charging circuit to control the rate of charging of said capacitor as a function of the length of the moving material, and means controlled by said discharge device upon discharge therethrough.

10. An apparatus for measuring a predetermined fractional length of longitudinally moving material, comprising a resistance-capacitance timing circuit including a capacitor in circuit with a limiting resistance, an electric discharge device, means connecting said capacitor to said electrical discharge device whereby an electrical discharge occurs through said discharge device when the electrical potential on said capacitor is raised to a predetermined value, a first sensing means responsive to the presence of the moving material to connect said capacitor in said charging circuit to initiate the charging of said capacitor, at least one additional sensing means to sense the length of said moving material, means connecting said additional sensing means to said timing circuit to control the amount of limiting resistance in said timing circuit as a function of the length of said moving material whereby the time required for the electrical potential of said capacitor means to be raised to said predetermined value is a function of the length of said moving material, and means controlled by said discharge device upon electrical discharge therethrough.

11. An apparatus for measuring a predetermined fractional length of material moving longitudinally at a constant rate of speed, comprising an electrical capacitor, an electrical charging circuit for said capacitor, current limiting impedance means in said charging circuit, said impedance means having a higher and a lower adjusted impedance value selectively connectible in said charging circuit to limit the charging current to said capacitor, an electrical discharge device, means connecting said capacitor to said electrical discharge device whereby an electrical discharge occurs through said discharge device when the electrical potential on said capacitor is raised to a predetermined value, a first sensing means responsive to the presence of the moving material to connect said capacitor in said charging circuit to initiate the charging of said capacitor, a second sensing means to sense the length of the moving material, said first and second sensing means being spaced lengthwise from each other along the path of movement of the material by a predetermined distance, means connecting said second sensing means to said impedance to connect said higher adjusted impedance value in said charging circuit for a length of time proportional to the amount by which the length of said material exceeds said predetermined distance and to connect said lower impedance value in said charging circuit for the remaining time necessary to charge said capacitor to a potential of said predetermined value, and means controlled by said discharge device upon discharge therethrough.

12. An apparatus for measuring a predetermined fractional length of longitudinally moving material comprising an electrical capacitor, an electrical charging circuit for said capacitor, an electrical discharge device, means connecting said capacitor to said electrical discharge device whereby the electrical potential on said capacitor is applied to said discharge device, a first sensing means responsive to the presence of said moving material to connect said capacitor in said charging circuit to initiate the charging of said capacitor, the electrical characteristics of said charging circuit, said capacitor, and said discharge device being so related to each other and to the rate of movement of said moving material that said capacitor is raised to a predetermined potential sufficient to cause discharge therethrough when a predetermined fraction of a predetermined minimum length of material has moved past said first sensing means, at least one additional sensing means responsive to the presence of said moving material to sense the length of said moving material in excess of said predetermined minimum length, and means connecting said additional sensing means in said charging circuit to modify the electrical characteristics of said charging circuit as a function of the length of said moving material in excess of said predetermined minimum length thereby to modify the time required for said capacitor to be charged to said predetermined potential, and means controlled by said discharge device upon discharge therethrough.

13. An apparatus for measuring a predetermined fractional length of longitudinally moving material, comprising a resistance-capacitance timing circuit including a capacitor in circuit with a limiting resistance, an electrical discharge device, means connecting said capacitor to said electrical discharge device whereby an electrical discharge occurs through said discharge device when the electrical potential on said capacitor is raised to a predetermined value, a first sensing means responsive to the presence of the moving material to connect said capacitor in said timing circuit to initiate the charging of said capacitor, the electrical characteristics of said timing circuit and of said discharge device being so related to each other and to the rate of movement of said moving material that the potential on said capacitor is raised to said predetermined value when a predetermined fraction of a predetermined minimum length of material has moved past said first sensing means, a second sensing means responsive to the presence of said moving material to sense the length of said moving material in excess of said predetermined minimum length, and means connecting said second sensing means to said timing circuit to vary the electrical characteristics of said timing circuit for a length of time proportional to the length of said moving material in excess of said predetermined minimum length thereby to increase the time required for said capacitor means to be charged to said predetermined value in accordance with the length of said material in excess of said predetermined minimum length.

14. An apparatus for measuring one-half the length of longitudinally moving material, comprising an electrical capacitor, an electrical charging circuit for said capacitor, current limiting impedance means in said charging circuit, said impedance means comprising two impedance sections of equal value connected in series with each other, means actuated by said capacitor when the electrical potential on said capacitor is raised to a predetermined value, a first sensing means responsive to the presence of the moving material to connect said capacitor in said charging circuit to initiate the charging of said capacitor, a second sensing means to sense the length of the moving material, said first and second sensing means being spaced lengthwise from each other along the path of movement of the material by a predetermined distance, means connecting said second sensing means to said impedance means to connect both of said impedance sections in said charging circuit to provide a first charging rate for a length of time proportional to the amount by which the length of said material exceeds said predetermined distance and to connect only one of said equal impedance sections in said charging circuit to provide a second charging rate twice as large as said first charging rate for the remaining time required to charge said capacitor to an electrical potential of said predetermined value.

15. An apparatus for measuring and cutting a predetermined fractional length of longitudinally moving material, comprising cutting means and clamping means positioned along the path of movement of the longitudinally moving material, an electrical capacitor, an electrical charging circuit for said capacitor, an impedance in said charging circuit, said impedance being adjustable to control the rate of charging of said capacitor, an electric discharge device, means connecting said capacitor to said electrical discharge device whereby an electrical discharge occurs through said discharge device when the electrical potential on said capacitor is raised to a predetermined value, a first sensing means responsive to the presence of said moving material to connect said capacitor in said charging circuit to initiate the charging of said capacitor, at least one additional sensing means to sense the length of the moving material, means connecting said additional sensing means to said impedance to adjust said impedance to control the rate of charging of said capacitor as a function of the length of the moving material, electric circuit means controlling the actuation of said cutting means and said clamping means, and means connecting said discharge device to said electric circuit means to control the actuation of said cutting means and said clamping means by the discharge of said discharge device.

16. An apparatus for measuring and cutting a predetermined fractional length of longitudinally moving material, comprising cutting means and clamping means positioned along the path of movement of the longitudinally moving material, an electrical capacitor, an electrical charging circuit for said capacitor, a plurality of current limiting impedances selectively connectible in said charging circuit to control the rate of charging of said capacitor, an electric discharge device, means connecting said capacitor to said electric discharge device whereby an electrical discharge occurs through said discharge device when the electrical potential on said capacitor is raised to a predetermined value, a first sensing means responsive to the presence of said moving material to connect said capacitor in said charging circuit to initiate the charging of said capacitor, at least one additional sensing means to sense the length of the moving material, means connecting said additional sensing means to said current limiting impedances to selectively connect said impedances in the charging circuit to control the rate of charging of said capacitor as a function of the length of the moving material, electric circuit means controlling the actuation of said cutting means and said clamping means, and means connecting said discharge device to said electric circuit means to control the actuation of said cutting means and said clamping means by the discharge of said discharge device.

17. An apparatus for measuring and cutting a predetermined fractional length of longitudinally moving material, comprising cutting means and clamping means positioned along the path of movement of the longitudinally moving material, an electrical capacitor, an electrical charging circuit for said capacitor, a first and a second current limiting impedance selectively connectible in said charging circuit to control the rate of charging of said capacitor, an electric discharge device, means connecting said capacitor to said electric discharge device whereby an electrical discharge occurs through said discharge device when the electrical potential on said capacitor is raised to a predetermined value, a first sensing means responsive to the presence of said moving material to connect said capacitor in said charging circuit to initiate the charging of said capacitor, at least one additional sensing means to sense the length of the moving material, means connecting said additional sensing means to said first and second current limiting impedances to selectively connect said impedances in the charging circuit to control the rate of charging of said capacitor as a function of the length of the moving material, electric circuit means controlling the actuation of said cutting means and said clamping means, and means connecting said discharge device to said electric circuit means to control the actuation of said cutting means and said clamping means by the discharge of said discharge device.

18. An apparatus for measuring and cutting a predetermined fractional length of longitudinally moving material, comprising cutting means and clamping means positioned along the path of movement of the longitudinally moving material, a resistance-capacitance timing circuit including a capacitor in circuit with a limiting resistance, an electric discharge device, means connecting said capacitor to said electrical discharge device whereby an electrical discharge occurs through said discharge device when the electrical potential on said capacitor is raised to a predetermined value, a first sensing means responsive to the presence of the moving material to connect said capacitor in said charging circuit to initiate the charging of said capacitor, at least one additional sensing means responsive to the presence of said moving material to measure the length of said moving material, means connecting said additional sensing means to said timing circuit to control the amount of limiting resistance in said timing circuit as a function of the length of said moving material whereby the time required for the electrical potential of said capacitor to be raised to said predetermined value is a function of the length of said moving material, electric circuit means controlling the actuation of said cutting means and said clamping means, and means connecting said discharge device to said electric circuit means to control the actuation of said cutting means and said clamping means by the discharge of said discharge device.

19. An apparatus for measuring and cutting a predetermined fractional length of longitudinally moving material, comprising cutting means and clamping means positioned along the path of movement of the longitudinally moving material, an electrical charging circuit for said capacitor, current limiting impedance means in said charging circuit, said impedance means having a higher and a lower adjusted impedance value selectively connectible in said charging circuit to limit the charging current to said capacitor, an electrical discharge device, means connecting said capacitor to said electrical discharge device whereby an electrical discharge occurs through said discharge device when the electrical potential on said capacitor is raised to a predetermined value, a first sensing means responsive to the presence of the moving material to connect said capacitor in said charging circuit to initiate the charging of said capacitor, a second sensing means to sense the length of the moving material, said first and second sensing means being spaced lengthwise from each other along the path of movement of the material by a predetermined distance, means connecting said second sensing means to said impedance means to connect said higher adjusted impedance value in said charging circuit for a length of time proportional to the amount by which the length of said material exceeds said predetermined distance and to connect said lower impedance value in said charging circuit for the remaining time necessary to change said capacitor to a potential of said predetermined value, electrical circuit means controlling the actuation of said cutting means and said clamping means, and means connecting said discharge device to said electric circuit means to control the actuation of said cutting means and said clamping means by the discharge of said discharge device.

20. An apparatus for measuring and cutting a length of longitudinally moving material into three equal lengths, comprising cutting means positioned along the path of movement of the longitudinally moving material, an electrical capacitor, an electrical charging circuit for said capacitor, said charging circuit including an adjustable current limiting impedance, an electrical discharge device, means connecting said capacitor to said electrical discharge device whereby an electrical discharge occurs through said discharge device to discharge said capacitor when the electrical potential on said capacitor is raised to a predetermined value, electrical circuit means controlling the actuation of said cutting means, means connecting said discharge device to said electrical circuit means to control the actuation of said cutting means by the discharge of said discharge device, means for sensing the length of the moving material, means for adjusting said impedance to provide a first rate of charging current to said capacitor for a length of time proportional to the amount by which said material exceeds a predetermined minimum length and to provide a second charging rate having a magnitude one and one-half times that of said first charging rate for the remaining time required to charge said capacitor to an electrical potential of said predetermined value, said cutting means being actuated by said discharge device to cut a one-third length of said material when the potential on said capacitor reaches said predetermined value, means for measuring the length of the remaining two-thirds length of material, means for adjusting said impedance to provide a third charging rate for said capacitor equal to one-half said second charging rate to recharge said capacitor for a length of time proportional to the amount by which said remaining two-thirds length exceeds two-thirds of said predetermined minimum length, and to provide a fourth charging rate equal to said second charging rate for the remaining time necessary to recharge said capacitor to said electrical potential of said predetermined value, whereupon said cutting means is actuated to cut said remaining two-thirds length into two equal lengths each equal to one-third of the original length of said material.

21. An apparatus for measuring a predetermined fixed length of longitudinally moving material, comprising a timing circuit including an electrical capacitor in circuit with a current limiting impedance, means connecting said timing circuit to a source of charging current, means actuated by said capacitor when the electrical potential on said capacitor is raised to a predetermined value, a sensing means responsive to the presence of the moving material to connect said capacitor in said timing circuit to initiate the charging of said capacitor, the electrical characteristics of said timing circuit and of the means actuated by said capacitor being so related to each other and to the rate of movement of the moving material that the potential on said capacitor is raised to said predetermined value when a predetermined length of material has moved past said sensing means.

22. An apparatus for measuring a predetermined fixed length of longitudinally moving material, comprising a timing circuit including an electrical capacitor in circuit with a current limiting impedance, means connecting said timing circuit to a source of charging current, an electrical discharge device, means connecting said capacitor to said electrical discharge device whereby an electrical discharge occurs through said discharge device when the electrical potential on said capacitor is raised to a predetermined value, a sensing means responsive to the presence of the moving material to connect said capacitor in said timing circuit to initiate the charging of said capacitor, the electrical characteristics of said timing circuit and of said discharge device being so related to each other and to the rate of movement of said moving material that the potential on said capacitor is raised to said predetermined value when a predetermined length of material has moved past said sensing means and means controlled by said discharge device upon discharge therethrough.

23. An apparatus for measuring a predetermined fractional length of material moving longitudinally at a variable rate of speed, comprising a timing circuit including an electrical capacitor, means connecting said timing circuit to a source of charging current, means actuated by said capacitor when the electrical potential on said capacitor is raised to a predetermined value, a first sensing means responsive to the presence of the moving material to connect said capacitor in said timing circuit to initiate the charging of said capacitor, means for supplying charging current pulses to said capacitor at a frequency proportional to the speed of movement of said material, and means for modifying the magnitude of said charging current pulses as a function of the length of said material, whereby the time required for the electrical potential of said capacitor to be raised to said predetermined value is a function of the speed of movement and of the length of said material.

24. An apparatus for measuring a predetermined fractional length of material moving longitudinally at a variable rate of speed, comprising a timing circuit including an electrical capacitor in circuit with a current limiting impedance, means connecting said timing circuit to a source of charging current, means actuated by said capacitor when the electrical potential on said capacitor is raised to a predetermined value, a first sensing means responsive to the presence of the moving material to connect said capacitor in said timing circuit to initiate the charging of said capacitor, a pulse generator, means connecting said pulse generator in said timing circuit whereby charging pulses are supplied to said capacitor at the frequency of said pulse generator, means for modifying the output frequency of said pulse generator in proportion to the speed of movement of said material, and means for modifying the value of said current limiting impedance as a function of the length of said material to modify correspondingly the magnitude of the charging current pulses, whereby the time required for the electrical potential of said capacitor to be raised to said predetermined value is a function of the speed of movement and of the length of said material.

25. An apparatus for measuring a predetermined fractional length of material moving longitudinally at a variable rate of speed, comprising an electrical capacitor, an electrical charging circuit for said capacitor, a current limiting impedance in said charging circuit, an electrical discharge device, means connecting said capacitor to said electrical discharge device whereby an electrical discharge occurs through said discharge device whereby an electrical discharge occurs through said discharge device when the electrical potential on said capacitor is raised to a predetermined value, a first sensing means responsive to the presence of the moving material to connect said capacitor, means for supplying charging current pulses to said capacitor at a frequency proportional to the speed of movement of said material, means for modifying the magnitude of said current limiting impedance as a function of the length of said material to modify correspondingly the magnitude of said charging current pulses, whereby the time required for the electrical potential of said capacitor to be raised to said predetermined value is a function of the speed of movement and of the length of said material, and means controlled by said discharge device upon discharge therethrough.

26. An apparatus for measuring a predetermined fractional length of material moving longitudinally at a variable rate of speed, comprising an electrical timing capacitor, an electrical charging circuit for said capacitor, said charging circuit including an additional capacitor means, means actuated by said timing capacitor when the electrical potential thereon is raised to a predetermined value, means for charging and discharging said additional capacitor means at a frequency proportional to the speed of movement of said material, means for adjusting the capacitance value of said additional capacitor means as a function of the length of the moving material to change the magnitude of the discharge and charging pulses of said additional capacitor means as a function of the length of the moving material, and means connecting said additional capacitor means to said timing capacitor so that an increment of charge is applied to said timing capacitor for each charge-discharge cycle of said additional capacitor means, whereby the time required for the electrical potential of said timing capacitor to be raised to said predetermined value is a function of the speed of movement and of the length of said material.

27. An apparatus for measuring a predetermined fractional length of material moving longitudinally at a variable rate of speed, comprising an electrical timing capacitor, an electrical charging circuit for said timing capacitor, said charging circuit including an additional capacitor means, an electrical discharge device, means connecting said timing capacitor to said electrical discharge device whereby an electrical discharge occurs through said discharge device when the electrical potential on said timing capacitor is raised to a predetermined value, a first sensing means responsive to the presence of the moving material to connect said capacitor in said charging circuit to initiate the charging of said capacitor, means for charging and discharging said additional capacitor means at a frequency proportional to the speed of movement of said material, means for adjusting the capacitance value of said additional capacitor means as a function of the length of the moving material to change the magnitude of the discharge and charging pulses of said additional capacitor means as a function of the length of the moving material, means connecting said additional capacitor means to said timing capacitor so that an increment of charge is applied to said timing capacitor for each charge-discharge cycle of said additional capacitor means, whereby the time required for the electrical potential of said timing capacitor to be raised to said predetermined value is a function of the speed of movement and of the length of said material, and means controlled by said discharge device upon discharge therethrough.

28. An apparatus for measuring a predetermined length of material moving longitudinally at a variable rate of speed, comprising a timing circuit including an electrical capacitor, means connecting said timing circuit to a source of charging current, means actuated by said capacitor when the electrical potential on said capacitor is raised to a predetermined value, a first sensing means responsive to the presence of the moving material to connect said capacitor in said timing circuit to initiate the charging of said capacitor, and means for supplying charging current pulses to said capacitor at a frequency proportional to the speed of movement of said material, whereby the time required for the electrical potential of said capacitor to be raised to said predetermined value is a function of the speed of movement of said material.

29. The method of measuring a required fractional length of longitudinally moving material and acting upon the material in response to the measurement of the required fractional length, comprising the steps of sensing the movement of the material past a predetermined point, initiating a flow of charging current to an electrical capacitor in response to the sensing of the initial movement of the material past the predetermined point, sensing the length of the moving material, modifying the flow of charging current to the capacitor as a function of the sensed length of the material to modify the time required for a predetermined potential to build up on the capacitor as a function of the sensed length, and, at the instant when the predetermined potential is reached on the capacitor, applying the predetermined potential to actuate means acting on the material.

30. The method of measuring a required fractional length of material moving longitudinally at a variable rate of speed and acting upon the material in response to the measurement of the required fractional length, comprising the steps of sensing the movement of the material past a predetermined point, initiating a flow of charging current pulses to an electrical capacitor in response to the sensing of the initial movement of the material past the predetermined point, sensing the rate of movement of the material, modifying the frequency of the current pulses as a function of the sensed rate of movement of the material, sensing the length of the material, modifying the amplitude of the current pulses as a function of the sensed length of the material, continuing the flow of current pulses modified as to frequency and as to amplitude while the material continues to move adjacent the predetermined point and until a predetermined potential is built up on the capacitor and, at the instant when the predetermined potential is built up on the capacitor, applying the predetermined potential to actuate means acting on the material.

References Cited by the Examiner

UNITED STATES PATENTS

| | | | |
|---|---|---|---|
| 2,600,482 | 6/52 | Collis et al. | 328—110 |
| 2,603,688 | 7/52 | Cole et al. | 328—5 |
| 2,890,750 | 6/59 | Depken | 83—370 |
| 2,912,563 | 11/59 | Schlieker et al. | 83—372 |

WILLIAM W. DYER, JR., *Primary Examiner.*

CARL W. TOMLIN, ANDREW R. JUHASZ, *Examiners.*